US007016588B2

(12) United States Patent
Edlinger et al.

(10) Patent No.: US 7,016,588 B2
(45) Date of Patent: Mar. 21, 2006

(54) WAVEGUIDE AND PROCESS FOR THE PRODUCTION THEREOF

(75) Inventors: Johannes Edlinger, Feldkirch (AT); Helmut Rudigier, Bad Ragaz (CH)

(73) Assignee: Unaxis Balzers Aktiengessellschaft, Balzers (LI)

( * ) Notice: Subject to any disclaimer, the term of this patent is extended or adjusted under 35 U.S.C. 154(b) by 0 days.

(21) Appl. No.: 10/935,449

(22) Filed: Sep. 7, 2004

(65) Prior Publication Data

US 2005/0031292 A1 Feb. 10, 2005

Related U.S. Application Data

(60) Division of application No. 10/457,852, filed on Jun. 10, 2003, now Pat. No. 6,804,445, which is a division of application No. 08/751,369, filed on Nov. 19, 1996, now Pat. No. 6,610,222, which is a continuation of application No. 08/278,271, filed on Jul. 21, 1994, now abandoned.

(30) Foreign Application Priority Data

Jul. 26, 1993 (CH) .................................... 2255/93

(51) Int. Cl.
*G02B 6/10* (2006.01)

(52) U.S. Cl. ...................................... 385/131; 385/129

(58) Field of Classification Search ......... 385/129–131
See application file for complete search history.

(56) References Cited

U.S. PATENT DOCUMENTS

| | | | | | |
|---|---|---|---|---|---|
| 4,749,245 | A | * | 6/1988 | Kawatsuki et al. | 385/130 |
| 5,170,461 | A | * | 12/1992 | Yoon et al. | 385/130 |
| 5,369,722 | A | * | 11/1994 | Heming et al. | 385/130 |

* cited by examiner

*Primary Examiner*—Michelle Connelly-Cushwa
*Assistant Examiner*—Jerry T. Rahll
(74) *Attorney, Agent, or Firm*—Notaro & Michalos PC

(57) ABSTRACT

An optical waveguide has a substrate with a surface of organic material, an inorganic material waveguide layer along the surface of organic material with a waveguide layer surface pointing toward the surface of organic material and an organic/inorganic material interface between the surface of organic material and the waveguide layer surface. The organic/inorganic interface is remote from the waveguide layer surface and is formed by the surface of organic material and a surface of an intermediate spacer system of inorganic material. The spacer system substantially preventing the material interface from being subjected to light energy of light guided in the waveguide layer.

33 Claims, 6 Drawing Sheets

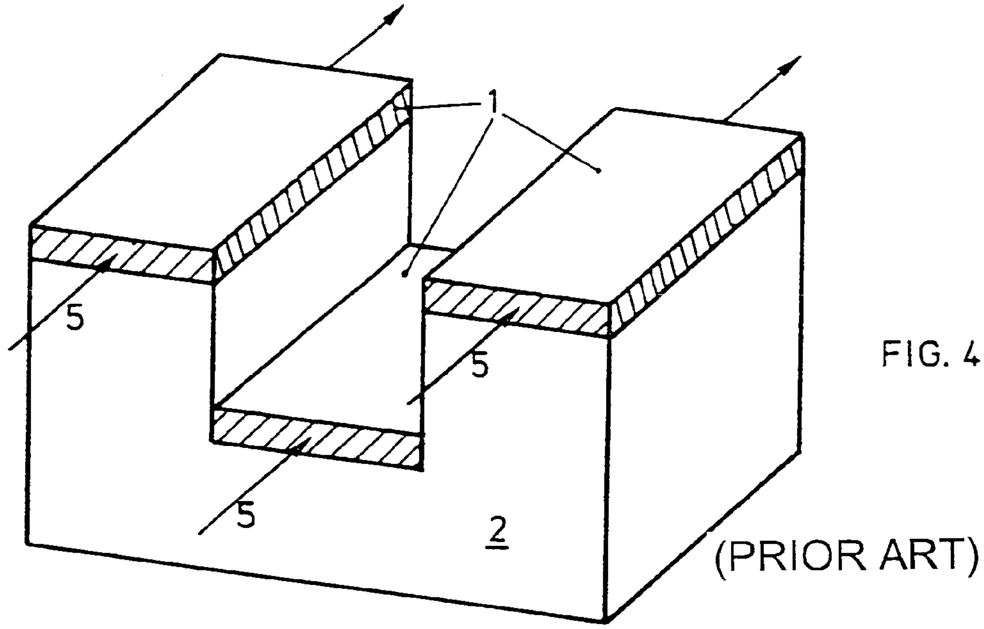
FIG. 4
(PRIOR ART)
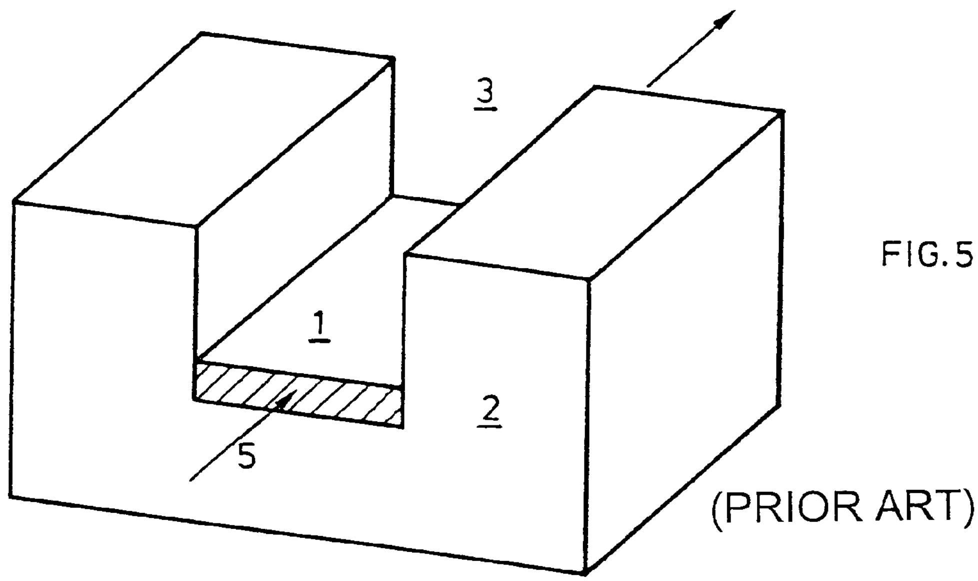
FIG. 5
(PRIOR ART)
FIG. 6a (PRIOR ART)
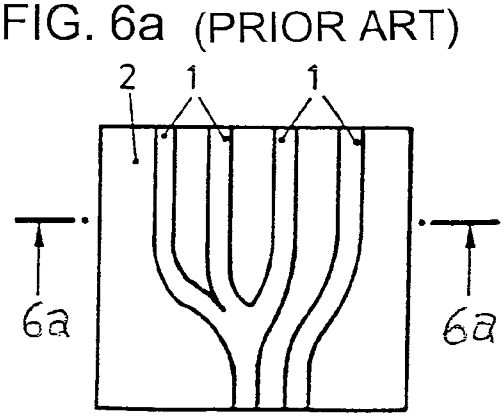
FIG 6b
(PRIOR ART)
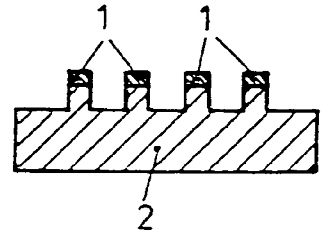

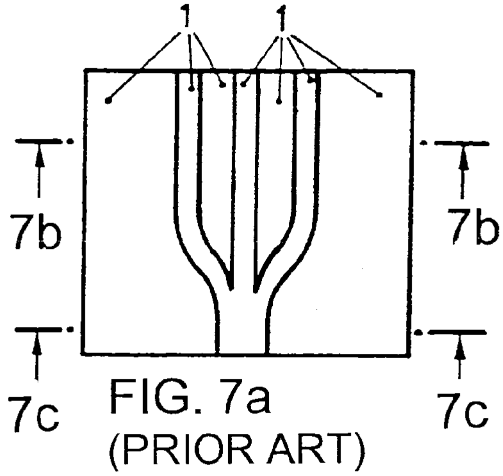
FIG. 7a
(PRIOR ART)
FIG. 7b
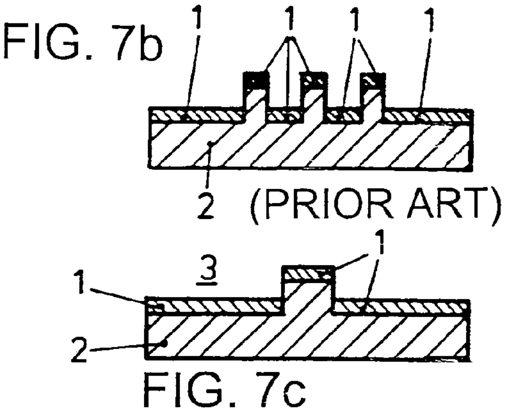
(PRIOR ART)
FIG. 7c
(PRIOR ART)
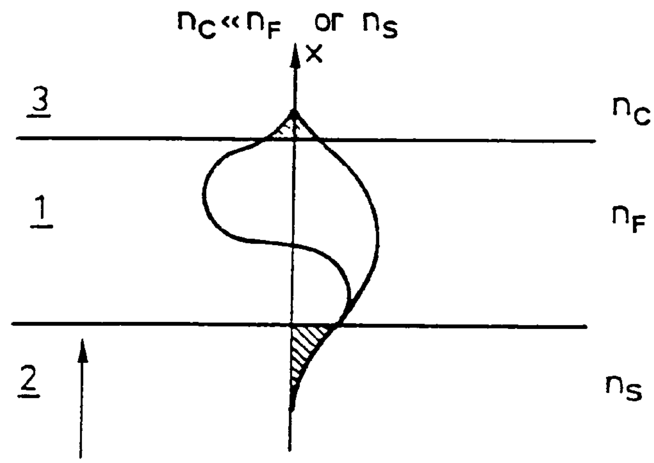
FIG. 8
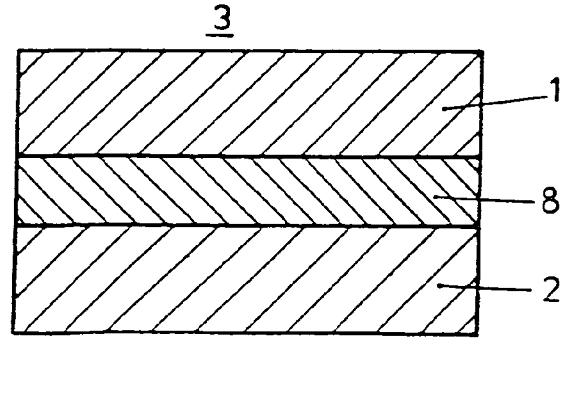
FIG. 9

WAVEGUIDE AND PROCESS FOR THE PRODUCTION THEREOF

CROSS-REFERENCE TO RELATED APPLICATIONS

This is a divisional of application Ser. No. 10/457,852 filed Jun. 10, 2003 and no U.S. Pat. No. 6,804,445, which was a divisional of application Ser. No. 08/751,369 file Nov. 19, 1996, now U.S. Pat. No. 6,610,222, which was a continuation of application Ser. No. 08/278,271 field Jul. 21, 1994, now abandoned, which claimed priority on Swiss application no 2255/93-5 filed Jul. 26, 1993, which priority claim is repeated here for the current application.

FIELD AND BACKGROUND OF THE INVENTION

The present invention concerns a waveguide, a process for the production of a waveguide, use of an intermediate layer on a waveguide and use of an organic substrate as a carrier substrate on a waveguide.

For many uses, for example sensors, integrated optics and the like it is desirable to have planar waveguides available. As shown in FIG. 1*a* such a waveguide, in its simplest form, includes a waveguide layer 1 with a refractive index $n_F$ on a substrate 2 with a refractive index $n_S$ and an ambient medium 3, the so-called cover medium, or cover, with a refractive index $n_C$ The cover medium can in turn be formed by a layer or a layer system, as shown in FIG. 1*b*. The following applies: $n_C<n_F$ and $n_S<n_F$.

For many uses at least one of those layers must be structured. In order for light to be coupled at all into the waveguide, the method which is in fact the most elegant method involves providing the waveguide with a structure 4—a grating—as shown in FIG. 2*a*, and coupling the light 5, for example a laser beam, into the waveguide layer 1 by way of diffraction. If the coupling-in angle, grating period and waveguide layer thickness are suitably selected, the light 6 is propagated in the waveguide layer 1 with a given propagation mode and leaves the waveguide for example at an end face 7.

It is immaterial whether the grating 4 is provided at the substrate surface or in or at the waveguide layer.

In addition it is often desirable for the waveguide to be spatially structured as a whole. FIG. 1*b* shows a waveguide without spatial structuring, FIGS. 3 and 4 show structured strip-type waveguides and FIG. 5 shows a buried strip-type waveguide. FIGS. 6 and 7 are a plan view and a view in section purely by way of example of more complex spatial structures of a waveguide. Structured waveguides of that kind are widely used for example in the communications art or in the sensor art.

As waveguides of that kind are usually constructed on a glass substrate, the structuring procedures employed are photo-lithographic methods and the following etching methods: ion milling, reactive ion etching, wet-chemical etching and the like.

Such structuring procedures are time-consuming and expensive.

In addition waveguides on a glass substrate can only be shaped with difficulty and they are sensitive in regard to mechanical stresses such as impact stresses.

The substrate/waveguide layer/environment interaction but in particular the substrate/waveguide layer interaction which is relevant here substantially determines the waveguide property.

SUMMARY OF THE INVENTION

The problem of the present invention is to propose a waveguide:

a) in which structuring is substantially simpler and therefore less expensive and which possibly b) is deformable within limits and/or c) is less sensitive to mechanical stresses and/or d) whose substrate can be used flexibly together with different waveguide layers and materials.

This is achieved in a waveguide of the kind set forth in the opening part of this specification by the configuration thereof as set forth in the claims.

Particularly when using a polymer, such as for example and as is preferred nowadays a polycarbonate, as the waveguide substrate, it is now very much cheaper to structure the waveguide in particular as a whole, whether this is done by embossing, deep-drawing, injection moulding and the like, and then in particular to provide the coating with a wave-conducting material. In that respect it is found that the application of a wave-conducting material to a substrate of organic material, in particular a polymer, is in no way trivial. It is observed in particular that the losses of a waveguide produced in that way, that is to say waveguide layer directly on the substrate, defined as a drop in terms of intensity with a given mode and a given wave length over a certain distance, are substantially higher, at least by a factor of 10, than when an inorganic material such as for example glass is used as the substrate material.

To our knowledge the problem involved here is substantially new territory. Admittedly there are indications in the literature, for example in "Design of integrated optical couplers and interferometers suitable for low-cost mass production", R. E. Kunz and J. S. Gu, ECIO 93-Conferenz in Neuchtel, that integrated optics could be inexpensively made from structured plastics material, but such reports can only document an existing need.

It is self-evident however that on the one hand all structuring procedures for organic materials, in particular polymers, and on the other hand coating processes such as CVD, PECVD, including vapour deposit, sputtering, ion plating, etc., belong to the state of the art. In that respect coating of plastics parts, for example spectacle lenses, reflectors etc. with very different materials also belongs to the state of the art, for example including by means of plasma polymerization.

Attention should further be directed to the theory of planar waveguides in "Integrated Optics: Theory and Technology", R. G. Hunsperger, Springer Series in Optical Sciences, Springer-Verlag 1984.

The invention, in regard to its various aspects, with preferred embodiments also being the subject-matter of the further claims, is described hereinafter by means of examples and figures.

BRIEF DESCRIPTION OF THE DRAWINGS

In that respect in the figures which have already been in part described:

FIGS. 3 and 4 are diagrammatic perspective views of waveguides, with spatial structuring;

FIG. 5 is a view corresponding to FIG. 3 or FIG. 4 showing structuring with a "buried" waveguide;

FIGS. 6*a*, 6*b*, 7*a*, 7*b* and 7*c* are a plan view and a view in section of waveguides with more complex structuring;

FIG. 8 is a diagrammatic view showing energy distributions or oscillation modes which occur for example on an asymmetrical waveguide in accordance with "Integrated Optics: Theory and Technology", Robert G. Hunsperger, Second Edition, Springer-Verlag 1984, page 36;

FIG. 9 is a cross-sectional view of a waveguide according to the invention;

DESCRIPTION OF THE PREFERRED EMBODIMENTS

To explain the realization which is the underlying basis of the invention FIG. 8 records the mode distribution on an asymmetrical waveguide comprising the waveguide layer 1, the substrate 2 and the cover 3. The field distribution of the two recorded modes is clear therefrom. It will be seen that the field or light energy is propagated not only in the wave-conducting layer 1, but also in the adjacent media, namely in the cover and the substrate. The percentage proportion of the energy which occurs outside the waveguide layer 1 depends inter alia on the thickness of the waveguide layer 1 and also the refractive indices $n_C$, $n_F$, $n_S$, the mode type (TE, TM) and the mode number. In the case of thin waveguide layers the energy proportion which occurs as a percentage in the substrate is greater than in the case of thicker layers. Thin layers however are of outstanding interest in particular for certain uses in the sensor art.

Figure 10:
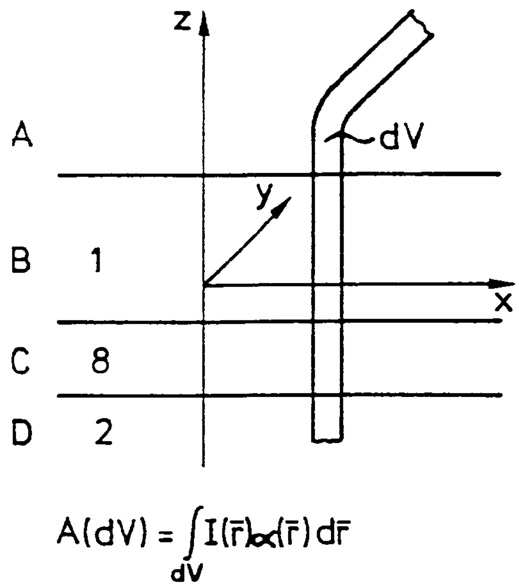
FIG. 10 is a diagrammatic view of a waveguide structure for defining its absorption or attenuation.

FIG. 10 shows by way of example superposed layers or phases A to D. The losses A (dV) in a volume element dV shown as a disk in FIG. 10 is defined as the volume integral of the local light intensity I(r) and a general loss coefficient $\alpha$ (r) which inter alia takes account of local absorption and diffusion. Accordingly the following applies in regard to the losses:

$$A(dV) = \int_{dV} I(r)\alpha(r)d(r)$$

wherein (r) denotes the radius vector.

It will be seen therefrom, looking back at FIG. 8, that the total losses of a waveguide as shown in FIG. 8 increase in proportion in particular to the increasing loss value $\alpha$ in the substrate but in particular at the substrate/waveguide interface and in proportion to the percentage amount of energy which occurs in particular however at the substrate/waveguide interface.

While wave-conducting layers on glass, for example on Corning 7059 overall have very low losses or a very low level of absorption, the losses of the same wave-conducting layers on organic material as a substrate material, such as in particular polymer substrates, for example on polycarbonate substrates, are higher at least by a factor of 10, in dependence on the thickness of the waveguide layer 1 and accordingly the percentage proportion of energy which occurs in the substrate material but in particular at the substrate/waveguide interface.

In that respect the above-mentioned increase in losses is not only a consequence of the respective coating process specifically employed but also a consequence of the interaction, discussed with reference to FIG. 8, of the substrate material and the wave-conducting layer.

FIG. 9 shows the structure of a waveguide according to the invention. It comprises a substrate 2 of organic material, in particular a polymer such as for example polycarbonate. The waveguide layer 1 is separated from the substrate 2 by at least one intermediate layer 8.

In accordance with the invention, the intermediate layer 8 and possibly an intermediate layer system 8 provides that light intensity I in the waveguide is low where the general loss coefficient $\alpha$ is high, whereby the losses are minimized. That is achieved by providing for a suitable configuration of the refractive index profile on the waveguide normal to the surface thereof.

Materials

1. Materials for the Wave-Conducting Layer 1:

The following are preferably used in particular for the wavelength range of 400 nm to 1000 nm:

$TiO_2$, $Ta_2O_5$, $ZrO_2$, $Al_2O_3$, $SiO_2$—$TiO_2$, $HfO_2$, $Y_2O_3$, $Nb_2O_5$, silicon nitride, oxynitride ($SiO_xN_y$, $HfO_xN_y$, $AlO_xN_y$ $TiO_xN_y$, $TaO_xN_y$) and $MgF_2$, $CaF_2$.

For wavelengths >1000 nm silicon, $SiO_x$, Ge, GaAs and GaAlAs preferably fall to be considered.

2. Substrate:

Organic materials, in that respect in particular polymers such as polycarbonate, PVC, polymethylmethacrylate (PMMA), and PET.

3. Material of the at Least One and Preferably the One Intermediate Layer 8:

Inorganic dielectric materials, in particular oxides, nitrides, carbides and the mixed forms thereof such as in particular $SiO_2$, $Si_3N_4$, more generally $SiO_xN_y$, and mixed materials, in particular with an $SiO_2$-component, an $Si_3N_4$-component or, more generally, an $SO_xN_y$-component.

4. Cover:

All known techniques with exposed waveguide layer or waveguide layer covered with a cover layer.

Processing Procedures:

1. Application of the Waveguide Layer

Preferably vacuum coating processes are used for this purpose, in particular plasma-enhanced CVD-processes (PECVD), CVD-processes, reactive PVD-processes, in particular reactive vapour deposit, sputter coating and ion plating. The plasmas used are DC- or AC-fed, which includes low-frequency HF- and microwave plasmas and DC+AC-mixed forms. It is also possible to use non-vacuum coating processes such as for example dip drawing and spin coating.

Having regard to the fact that the at least one wave-conducting layer 1 is to be applied to the substrate material used in accordance with the invention, coating processes are preferably used in which the substrate temperature is lower than the softening temperature of the substrate material employed, in particular <100° C., preferably <60° C.

2. Application of the at Least One Intermediate Layer:

The same methods are used as for applying the waveguide layer, with the same limitations in regard to substrate temperature control. It is additionally possible to use plasma polymerisation if for example a silicon-containing monomer is used for the layer deposit operation.

3. Substrate:

The substrate of organic material, by far and away preferably a polymer, is shaped by means of a process which is known for processing plastics material. That includes in particular embossing, deep drawing, injection molding and blow molding (for PET-plastics).

Besides the optical function, namely providing for light intensity at an optimum low level in substrate material or at a substrate/layer interface, with a high level of absorption, the intermediate layer used in accordance with the invention or a layer of the intermediate layer system used in accordance with the invention acts as a bonding layer between the substrate on the one hand and the superposed layers. It is entirely possible to provide, towards the waveguide layer, a first intermediate layer which principally provides the desired optical insulation effect, and to solve the adhesion problem by means of a further intermediate layer, bearing against the substrate.

The losses at a waveguide according to the invention are of the same order of magnitude as the losses on conventional waveguides of glass substrate, and are in particular less than 100 dB/cm, preferably less than 50 dB/cm and in particular even lower than 10 dB/cm.

Moreover a fact of extraordinary importance is that the provision of the intermediate layer 8 in accordance with the invention, as shown in FIG. 9, means that the properties of the waveguide layer 1 are decoupled from those of the substrate 2. That affords the possibility, which is utilized in accordance with the invention, of using different waveguide layer materials on a substrate of a given material depending on the respective purpose of use involved (wavelength, mode), without the correspondingly varying interactions between the waveguide layer material and the substrate material having to be taken into consideration to a substantial degree. That also makes it possible to select in particular polymer materials which are to satisfy other criteria than optical criteria, as the substrate material.

As was made clear, the structures shown by way of example in particular in FIGS. 2, 3 and 4 to 7 can be easily effected with the substrate material which is provided in accordance with the invention, and maintenance of the good optical properties which are known from the use of glass substrate is ensured by the provision of the intermediate layer in accordance with the invention.

FIGS. 11*a* to 11*f* show preferred refractive index profiles in relation to the thickness dimension z of the waveguide according to the invention. Therein the identification "ZS" denotes "intermediate layer", the identification "S" denotes "substrate" and the identification "F" denotes the "waveguide layer".

In regard to establishing the refractive index or the refractive index variation by way of the intermediate layer which is provided in accordance with the invention, corresponding to its thickness dimension $D_{ZS}$, there are various possible alternatives, as can be seen from these Figures. In most cases the refractive index of the intermediate layer is chosen to be lower than that $n_F$ of the waveguide layer. As is clear from FIGS. 11*b*, 11*d*, 11*e* and 11*f*, it is readily possible for the configuration of the refractive index to be formed with a gradient, in particular in the intermediate layer or the intermediate layer system. That variant is preferably to be adopted when the intermediate layer is applied by plasma polymerization.

Figure 11A:
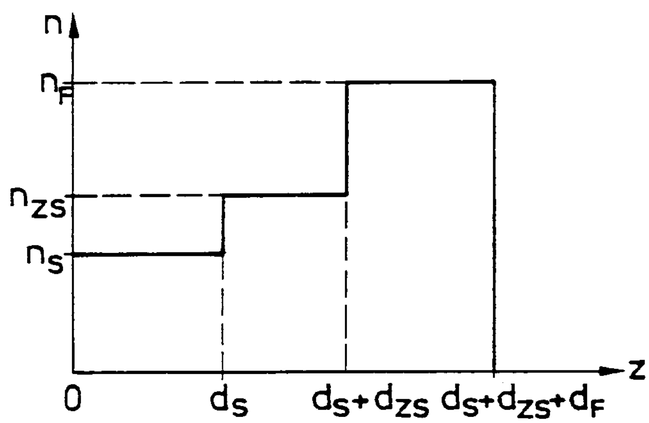
FIGS. 11*a*, 11*b*, 11*c*, 11*d*, 11*e* and 11*f* show various possible refractive index variations plotted in relation to the thickness dimension on waveguides according to the invention.
Figure 11B:
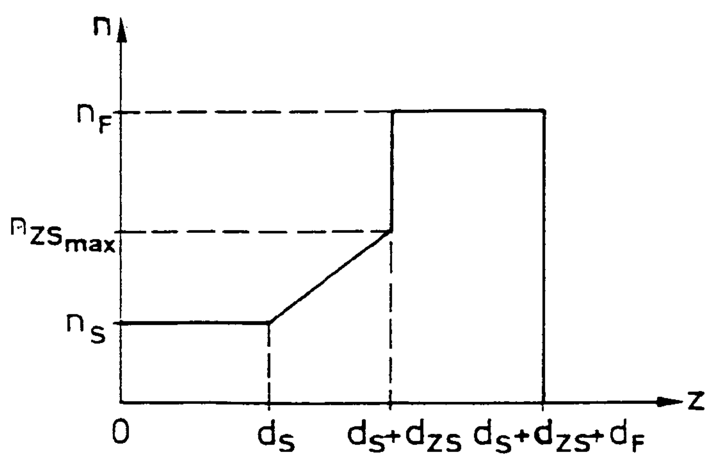
Figure 11C:
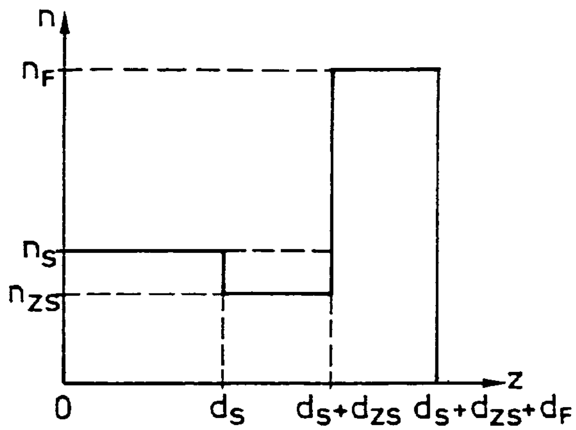
Figure 11D:
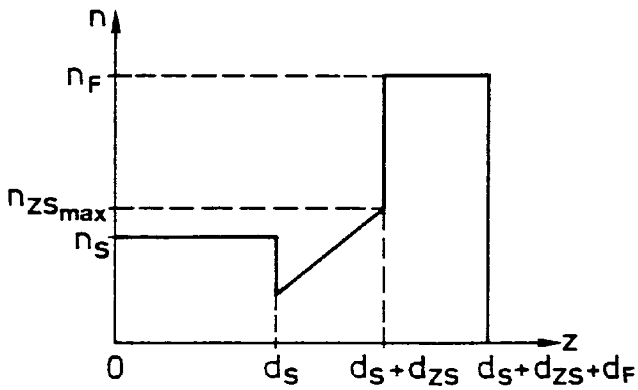
Figure 11E:
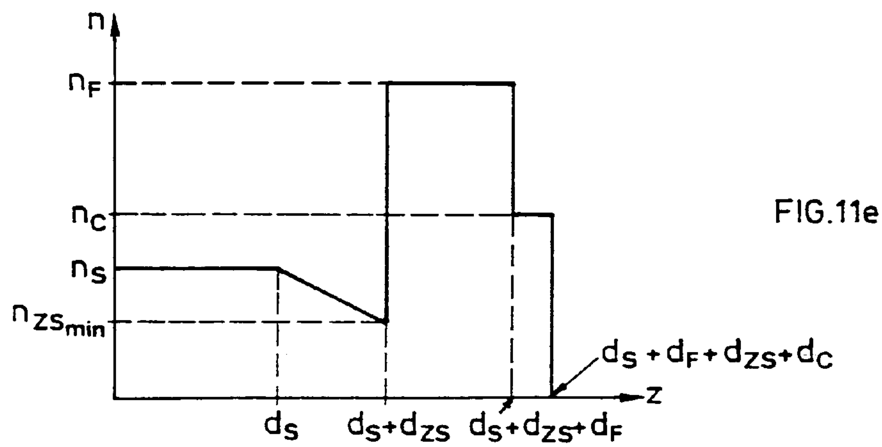
Figure 11F:
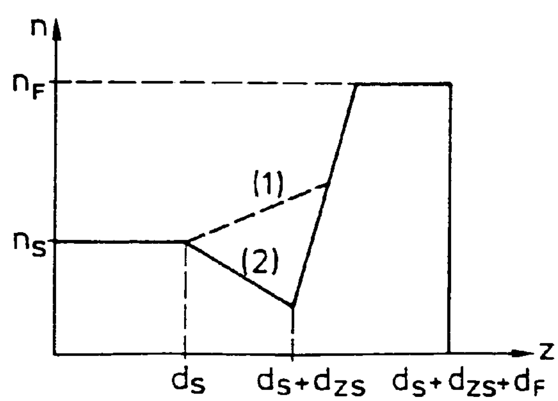

In this respect, FIG. 11*f* shows two possibilities whereby the refractive index of the intermediate layer, starting from the refractive index of the substrate material $n_S$, rises or falls. It is further shown therein that a refractive index gradient can be provided, for example by virtue of a diffusion zone, in the interface region between the intermediate layer and the waveguide layer. The thickness of the intermediate layer is preferably such that only a negligible proportion of the light energy I passes into the high-loss zone of the substrate/waveguide interface.

When a layer of inorganic material, more specifically waveguide layer material, is directly applied to an organic substrate material, in particular a polymer material, there is a high level of probability that reactions occur between components of the polymer and those of the applied wave-conducting layer. There is a high level of probability that this reaction results in a high-absorption transitional phase. This is if the waveguide were applied directly to a polymer substrate.

In accordance with the invention however, because of the similarity between the inorganic intermediate layer material and the waveguide layer material, such an interface reaction occurs to a much lesser degree, and any interface reaction between the intermediate layer material and the substrate material results only in low losses because the intermediate layer ensures that only low light energy values lead to losses at all at that interface.

Therefore the intermediate layer according to the invention does not suppress the above-mentioned interface reaction at the substrate surface, but in practice a glass intermediate layer is simulated between the substrate and the waveguide layer. Unwanted surface roughness at the substrate used in accordance with the invention are smoothed out to a certain degree by the provision of the intermediate layer according to the invention, in dependence on the coating parameters.

A waveguide with the refractive index profile was produced in principle as shown in FIG. 11*c*, under the following conditions. The substrate material used was polycarbonate with a refractive index $n_S$=1.538. The intermediate layer material used was $SiO_2$ while the material of the waveguide layer was $TiO_2$. The waveguide was not covered but air acts as the cover medium.

Process Parameters for $TiO_2$-Waveguide on a PC7-Substrate with an $SiO_2$-Intermediate Layer:

Intermediate Layer Coating Process:

Sputter coating with plasma production from a DC-source whose output is temporarily cyclically separated from the plasma discharge section and the latter is temporarily short-circuited.

| Target: | |
|---|---|
| Target: | Ak525; SiS23379 |
| Magnetron: | MC-525 |
| Distance between target and substrate: | 70 mm |
| DC-source | 10 kW |
| Vacuum chamber | BAK-760S |
| Argon pressure: | pAr = 4E−3 mbar |
| Set discharge power: | p = 6 kW |
| DC-voltage in the metal mode: | Usb = −695 V |
| DC-voltage in the transition mode: | Usb = −595 V |
| Argon flow: | qAr = 58.8 sccm |
| $O_2$-flow: | $qO_2$ = 47 sccm |

-continued

Figure 1A:
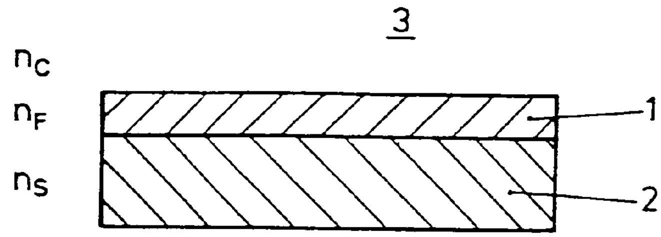
FIG. 1*a* shows a view in cross-section through a waveguide of conventional kind.
Figure 1B:
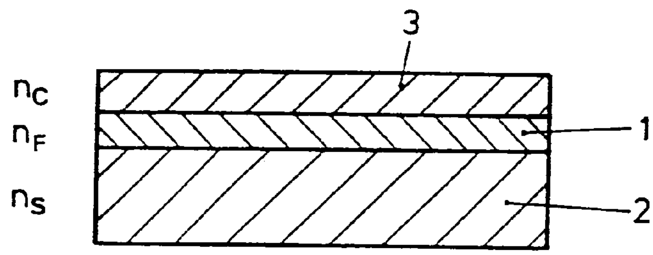
FIG. 1*b* is a view corresponding to FIG. 1*a* of a waveguide with cover layer.
Figure 2:
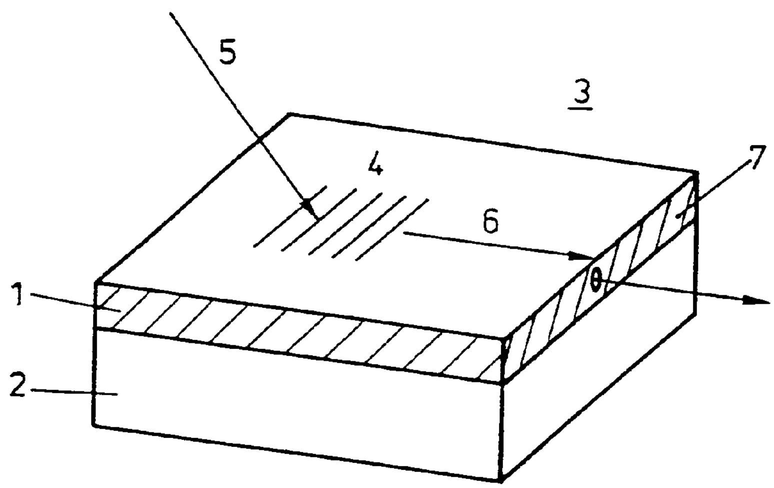
FIG. 2 is a diagrammatic perspective view of a portion of a waveguide to describe a structuring provided in the waveguide layer or substrate for coupling-in light.
Figure 3:
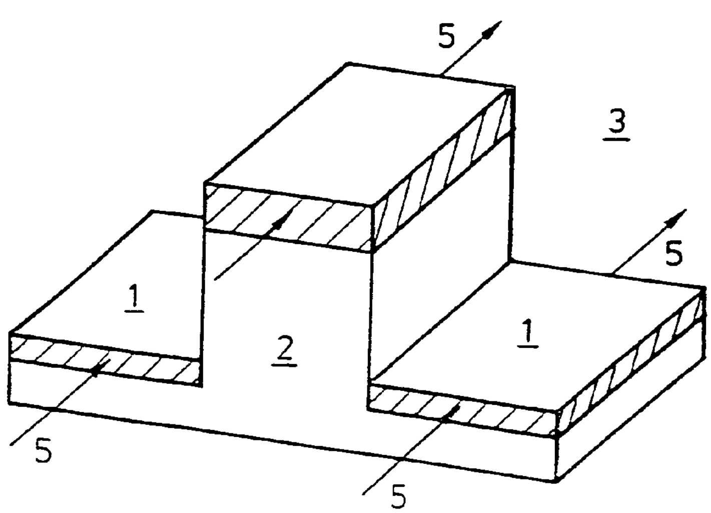

| Target: | |
|---|---|
| $SiO_2$-layer thickness: | varying as Shown in FIG. 2 |
| Sputter rate: | R = 0.28 nm/s |

Production of the Waveguide Layer:

By means of sputtering as for the production of the intermediate layer.

| | |
|---|---|
| Target: | Ak525; TI92-421/1 |
| Magnetron: | MC-525 |
| Distance target/intermediate layer-coated substrate | 70 mm |
| DC-source: | 10 kW |
| Vacuum chamber: | BAK-760 S |
| Argon pressure: | pAr = 4E−3 mbar |
| Plasma discharge power: | P = 6 kW |
| DC-voltage in the metal mode: | Usb = −531 V |
| DC-voltage in the transition mode: | Usb = −534 V |
| Argon flow: | qAr = 57.4 sccm |
| Oxygen flow: | $qO_2$ = 17 sccm |
| Thickness of the $TiO_2$-waveguide layer: | 95 nm |
| Sputter rate: | R = 0.069 nm/s. |

Taking the resulting waveguide, the losses found were about 8 dB/cm in the TM-mode and at a wavelength of 633 nm, with a thickness d $SiO_2$ of 20 nm.

Figure 12:
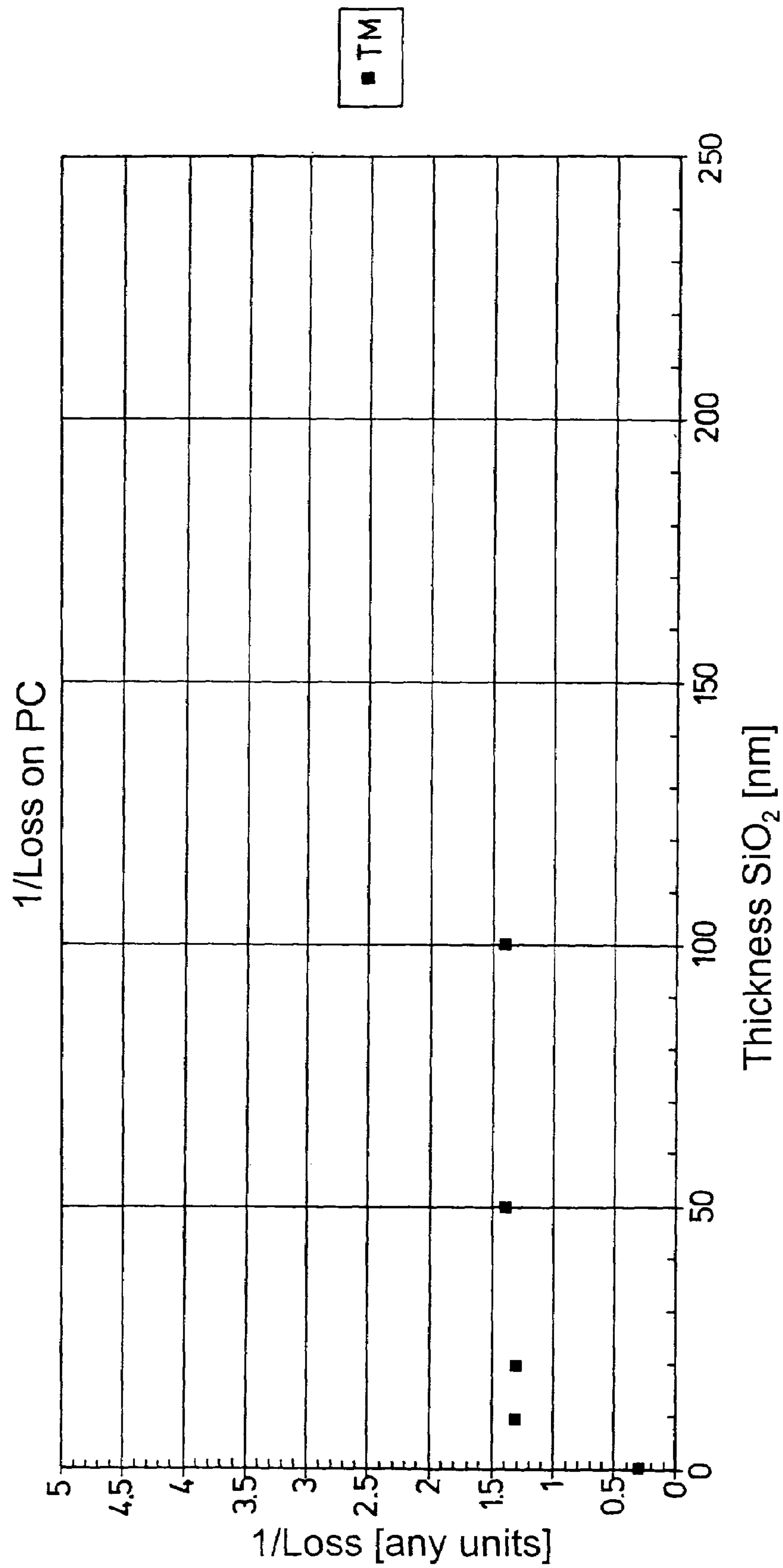
FIG. 12 shows in relation to the thickness dimension of a silicon dioxide intermediate layer provided in accordance with the invention the relative losses in dB on the resulting waveguide according to the invention and at the layer thickness 0 the losses thereof without an intermediate layer provided in accordance with the invention.

FIG. 12 records the relative losses in dB in relation to the thickness d of the $SiO_2$-intermediate layer. An improvement of about a factor of 2 is already achieved with an intermediate layer thickness of 5 nm. It will be clear therefrom that, with a vanishing intermediate layer, the losses increase by about a factor of 4, compared to the losses with the provision of an intermediate layer of 10 nm.

It is therefore also proposed that preferably the intermediate layer should be provided in accordance with the invention with a thickness of <10 nm, and in that respect, as will be readily apparent, as thin as possible in order to minimize the production costs, that is to say preferably about 10 nm.

What is claimed is:

1. An optical waveguide comprising:

a substrate with a surface of organic material, an inorganic material waveguide layer along said surface of organic material with a waveguide layer surface pointing towards said surface of organic material, an organic/inorganic material interface between said surface of said organic material and said waveguide layer surface, said organic/inorganic interface being remote from said waveguide layer surface and being formed by said surface of said organic material and a surface of an intermediate spacer system of inorganic material, and said spacer system substantially preventing said material interface from being subjected to light guided in said waveguide layer, wherein the index of refraction varies along the thickness of said spacer system.

2. The optical waveguide according to claim 1, said substrate being embossed, deep-drawn or injection-molded.

3. The optical waveguide of claim 1, said substrate being of a polymer material.

4. The optical waveguide of claim 1, said substrate being of a polycarbonate.

5. The optical waveguide according to claim 1, wherein said inorganic material of said spacer system comprises at least one of $SiO_2$ and of $Si_3N_4$.

6. The optical waveguide according to claim 1, wherein said spacer system directly bears with a bearing surface on said waveguide layer surface, the index of refraction of said inorganic material along said bearing surface of said spacer system being smaller than the index of refraction of said inorganic material of said waveguide layer.

7. The optical waveguide of claim 1, wherein said spacer system directly bears on said waveguide layer and has a substantially lower level of propagation attenuation than said substrate.

8. The optical waveguide according to claim 1, wherein material of said waveguide layer is selected from one of the group (a) or (b) consisting essentially of (a) $TiO_2$, $TaO_5$, $ZrO_2$, $Al_2O_3$, $SiO_2$—$TiO_2$, $HfO_2$, $Y_2O_3$, $Nb_2O_5$, silicon nitride, oxynitride $SiO_xN_y$, $HfO_xN_y$, $AlO_xN_y$, $TiO_xN_y$, $TaO_xN_y$ and $MgF_2$, $CaF_2$, (b) silicone, $SiO_x$, Ge, GaAs, GaAlAs.

9. The optical waveguide of claim 8 guiding light with a wavelength of between 400 nm and 1000 nm, wherein the material of said waveguide layer is the material of group (a).

10. The optical waveguide of claim 8 guiding light with a wavelength larger than 1000 nm, wherein the material of said waveguide layer is the material of group (b).

11. The optical waveguide of claim 1, wherein said material of said spacer system contains at least one of $SiO_2$ and of a mixture of $SiO_2$ and $TiO_2$ and of $Si_3N_4$.

12. The optical waveguide of claim 1, wherein said inorganic material of said spacer system is of one of $SiO_2$ and of $Si_3N_4$.

13. The optical waveguide of claim 1, wherein said spacer system has a thickness of at least 5 nm.

14. The optical waveguide of claim 1, wherein said spacer system has a thickness of at least 10 nm.

15. The optical waveguide of claim 1 wherein said varying starts at a position adjacent said substrate with a value of index of refraction corresponding to the value of index of refractive of said material of said substrate.

16. The optical waveguide of claim 1, wherein said spacer system substantially acts as an intermediate substrate made of glass would act.

17. An optical waveguide comprising:

a substrate with a surface of organic material, having a roughness an inorganic material waveguide layer along a part of said surface of organic material with a waveguide layer surface pointing towards said part of said surface of organic material, an organic/inorganic material interface between said part of said surface of said organic material and said waveguide layer surface, said organic/inorganic interface being remote from said waveguide layer surface and being formed by said part of said surface with said roughness of said organic material and a surface of an intermediate spacer system of inorganic material, said spacer system substantially preventing said material interface from being subjected to light energy of light guided in said waveguide layer and further preventing said roughness from influencing wave guiding of said optical waveguide device.

18. The optical waveguide of claim 17, wherein the index of refraction varies along the thickness of said spacer system.

19. The optical waveguide of claim 18, wherein said varying starts at a position adjacent said substrate with a value of index of refraction corresponding to the value of index of refractive of said material of said substrate.

20. The optical waveguide according to claim 17, said substrate being embossed, deep-drawn or injection-molded.

21. The optical waveguide of claim 17, said substrate being of a polymer material.

22. The optical waveguide of claim 17, said substrate being of a polycarbonate.

23. The optical waveguide according to claim 17, wherein said inorganic material of said spacer system comprises at least one of $SiO_2$ and of $Si_3N_4$.

24. The optical waveguide according to claim 17, wherein said spacer system directly bears with a bearing surface on said waveguide layer surface, the index of refraction of said inorganic material along said bearing surface of said spacer system being smaller than the index of refraction of said inorganic material of said waveguide layer.

25. The optical waveguide of claim 17, wherein said spacer system directly bears on said waveguide layer and has a substantially lower level of propagation attenuation than said substrate.

26. The optical waveguide according to claim 17, wherein material of said waveguide layer is selected from one of the group (a) or (b) consisting essentially of (a) $TiO_2$, $TaO_5$, $ZrO_2$, $Al_2O_3$, $SiO_2$—$TiO_2$, $HfO_2$, $Y_2O_3$, $Nb_2O_5$, silicon nitride, oxynitride $SiO_xN_y$, $HfO_xN_y$, $AlO_xN_y$, $TiO_xN_y$, $TaO_xN_y$ and $MgF_2$, $CaF_2$, (b) silicone, $SiO_x$, Ge, GaAs, GaAlAs.

27. The optical waveguide of claim 26 guiding light with a wavelength of between 400 nm and 1000 nm, wherein the material of said waveguide layer is the material of group (a).

28. The optical waveguide of claim 26 guiding light with a wavelength larger than 1000 nm, wherein the material of said waveguide layer is the material of group (b).

29. The optical waveguide of claim 17, wherein said material of said spacer system contains at least one of $SiO_2$ and of a mixture of $SiO_2$ and $TiO_2$ and of $Si_3N_4$.

30. The optical waveguide of claim 17, wherein said inorganic material of said spacer system is of one of $SiO_2$ and of $Si_3N_4$.

31. The optical waveguide of claim 17, wherein said spacer system has a thickness of at least 5 nm.

32. The optical waveguide of claim 17, wherein said spacer system has a thickness of at least 10 nm.

33. The optical waveguide of claim 17, wherein said spacer system substantially acts as an intermediate substrate made of glass would act.

* * * * *